United States Patent
Sawabe

(10) Patent No.: US 6,499,920 B2
(45) Date of Patent: *Dec. 31, 2002

(54) TAP

(75) Inventor: Teruo Sawabe, Tokyo (JP)

(73) Assignee: Tanoi Mfg. Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,581

(22) Filed: Apr. 22, 1999

(65) Prior Publication Data

US 2001/0041108 A1 Nov. 15, 2001

(30) Foreign Application Priority Data

Apr. 30, 1998 (JP) .......................... 10-120626

(51) Int. Cl.[7] .................. B23B 51/06; B23G 5/06
(52) U.S. Cl. ................ 408/222; 408/59; 470/198
(58) Field of Search .................. 408/59, 216, 217, 408/220, 222, 223; 470/198, 199

(56) References Cited

U.S. PATENT DOCUMENTS

| 1,256,138 | A | * | 2/1918 | Kehl | 470/200 |
| 1,475,561 | A | | 11/1923 | Bath et al. | |
| 1,525,536 | A | * | 2/1925 | Debrot | 470/198 X |
| 2,787,010 | A | * | 4/1957 | Uphoff | 408/215 |
| 2,898,612 | A | | 8/1959 | Hofbauer | 10/140 |
| 3,945,069 | A | * | 3/1976 | Cecil | 470/198 |
| 4,762,444 | A | * | 8/1988 | Mena | 470/198 |
| 5,033,919 | A | * | 7/1991 | Choe | 408/217 |
| 5,664,915 | A | * | 9/1997 | Hawke | 470/198 |
| 5,797,710 | A | * | 8/1998 | Sawabe et al. | 408/215 |

FOREIGN PATENT DOCUMENTS

| DE | 259467 | | 12/1911 | | |
| DE | A1 28 52 906 | | 6/1980 | | |
| DE | A1 39 32 522 | | 4/1990 | | |
| GB | 1 500 380 | | 2/1978 | | |
| JP | 63-306820 | * | 12/1988 | | 470/198 |
| JP | 2-95513 | * | 4/1990 | | 470/198 |

* cited by examiner

Primary Examiner—Henry Tsai
(74) Attorney, Agent, or Firm—Sughrue Mion, PLLC

(57) ABSTRACT

A cutting tap comprises a threaded portion including a lead whose thread diameter gradually decreases toward a front end of the lead, a complete thread portion continued from the lead, and four flutes arranged at equal intervals in a circumferential direction. In the cutting tap, a first cutting edge portion for processing a prepared hole is formed at a front end surface of the lead, and a second cutting edge portion for finishing a minor diameter of an internal thread is formed in a part of an outer periphery of the complete thread portion, the second cutting edge portion being one or more pitches long. The cutting tap can perform processing of a prepared hole, tapping, and finishing of a minor diameter by a single step, and can also perform tapping even if a prepared hole for an internal thread is a blind hole or the like and does not have enough space.

4 Claims, 6 Drawing Sheets

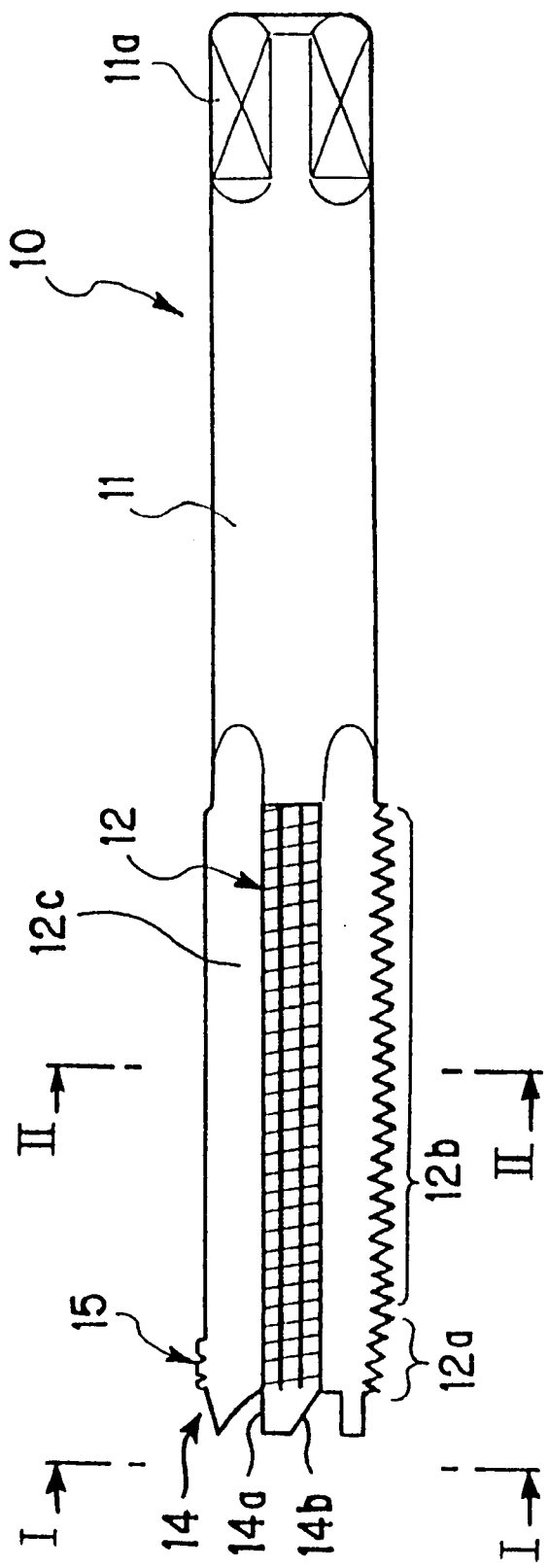

TAP

BACKGROUND OF THE INVENTION

1. Field of the Invention

The present invention relates to a cutting type tap and a plastic working type tap which are suitable for tapping of a cored hole or the like.

2. Description of the Related Art

Formation of an internal thread has so far been performed in succession to drilling. This has posed the inconvenience of requiring facilities and time for replacement of tools. Thus, a proposal has recently been made, as in Japanese Utility Model Publication No. 25782/93, for a tap for a cored hole which has a guide portion connected to a front end of a tapping portion, and a cutting edge capable of face cutting which is provided at a front end of the guide portion so that the processing of a prepared hole and tapping can be performed by a single step.

With the above-mentioned conventional tap for a cored hole, an incomplete thread portion of the tap increases by the amount of the guide portion. Thus, if the prepared hole for an internal thread is a through hole or has enough space, no problem is posed. However, if the prepared hole for an internal thread is a blind hole or the like and does not have enough space, tapping cannot be performed. Even if tapping is possible because the prepared hole for an internal thread is a through hole or has enough space, an inner peripheral surface of the prepared hole worked by the tapping portion becomes, as is, a crest surface of an internal thread. For this reason or else, sufficiently satisfactory finished surface roughness or accuracy is not always obtained depending on the machining conditions.

SUMMARY OF THE INVENTION

The present invention has been accomplished in view of the above-described circumstances. It is an object of the invention to provide taps of a cutting type and a plastic working type which can perform processing of a prepared hole, tapping, and finishing of a minor diameter by a single step, and which can carry out tapping even if a prepared hole for an internal thread is a blind hole or the like and does not have enough space.

A first aspect of the invention for attaining the above object is a tap for performing processing of a prepared hole and tapping by a single step, the tap having a threaded portion for performing tapping by chipping, the threaded portion including a lead whose thread diameter gradually decreases toward a front end of the lead, a complete thread portion continued from the lead, and a plurality of flutes arranged in a circumferential direction; a first cutting edge portion formed at a front end surface of the lead for processing a prepared hole; and a second cutting edge portion formed in a part of an outer periphery of the complete thread portion for finishing a minor diameter of an internal thread, the second cutting edge portion being one or more pitches long.

A second aspect of the invention is a tap for performing processing of a prepared hole and tapping by a single step, the tap having a threaded portion for performing tapping by plastic working, the threaded portion including a lead forwardly tapered in a complete thread form, a parallel thread portion continued from the lead, and a plurality of oil grooves arranged in a circumferential direction; a first cutting edge portion formed at a front end surface of the lead for processing a prepared hole; and a second cutting edge portion formed in a part of an outer periphery of the lead for finishing a minor diameter of an internal thread.

According to the tap of the present invention, processing of a prepared hole, tapping, and finishing of a minor diameter can be performed by a single step without replacement of tools, the processing man-hours and the processing time can be markedly decreased, and productivity can be increased. Furthermore, the first cutting edge portion is directly provided at the front end surface of the lead of the threaded portion, without a guide portion provided there, and the second cutting edge portion is provided in the threaded portion. Thus, the entire length of the tap need not be increased, and tapping can be performed even if a prepared hole for an internal thread is a blind hole or the like and does not have enough space.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is an overall constitution drawing of a thread forming tap according to a second embodiment of the present invention.

PREFERRED EMBODIMENTS OF THE INVENTION

A tap according to the present invention will now be described in detail by way of the following Embodiments with reference to the accompanying drawings, but it should be understood that the invention is not restricted thereby.

[First Embodiment]

Figure 1:
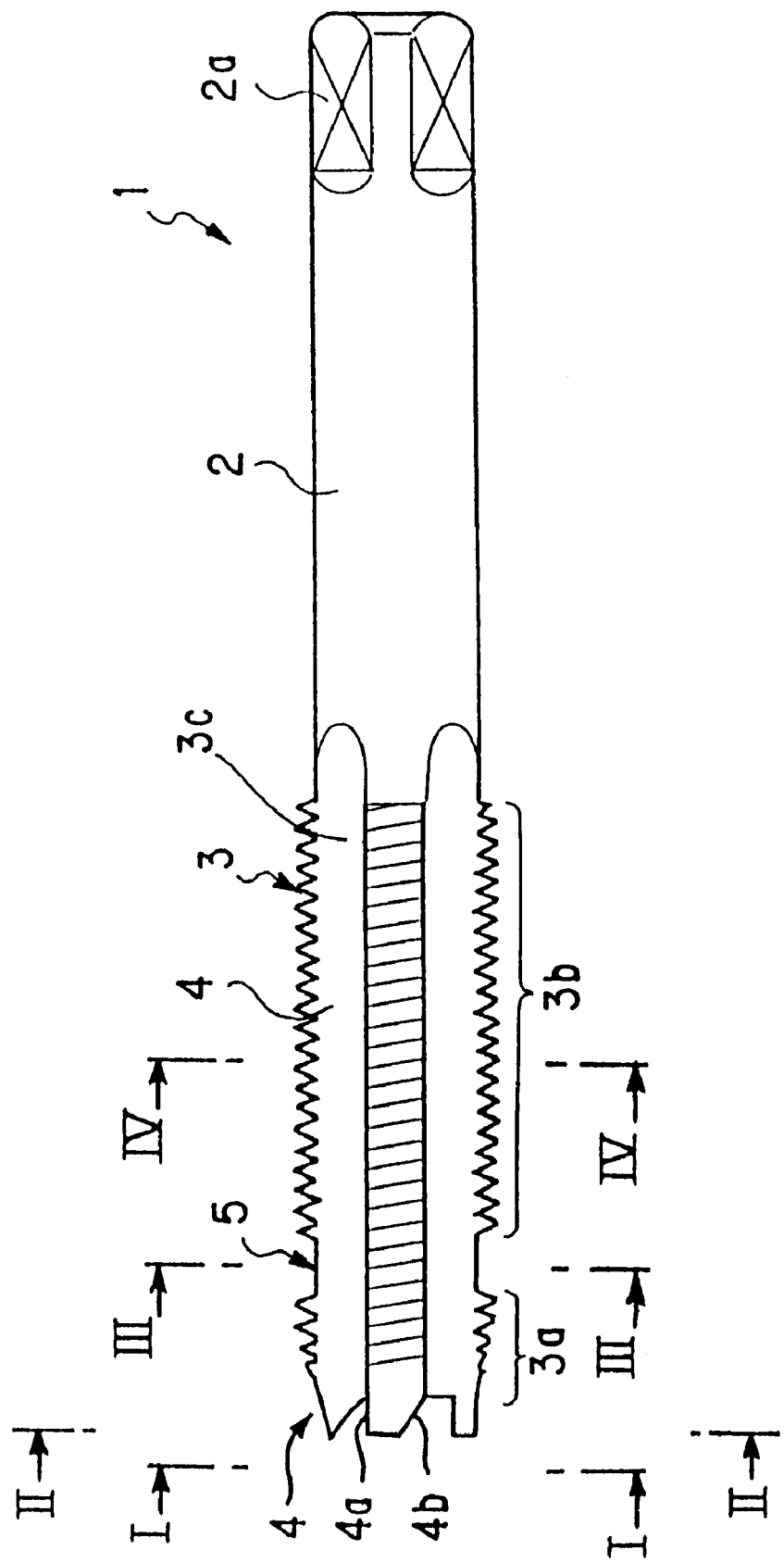
FIG. 1 is an overall constitution drawing of a cutting tap according to a first embodiment of the present invention.
Figure 2A:
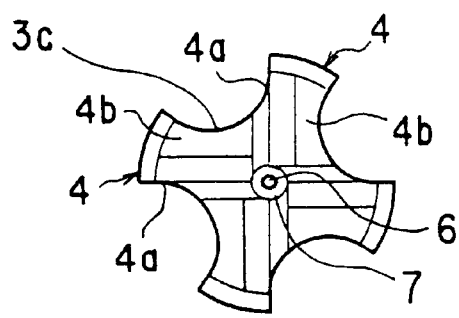
FIG. 2(a) is a view taken on line I—I of FIG. 1.
Figure 2B:
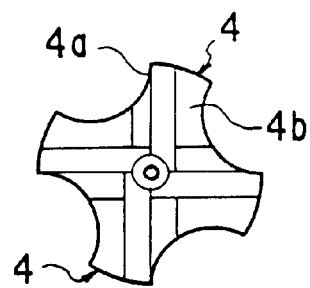
FIG. 2(b) is an end face view taken on line II—II of FIG. 1.
Figure 2C:
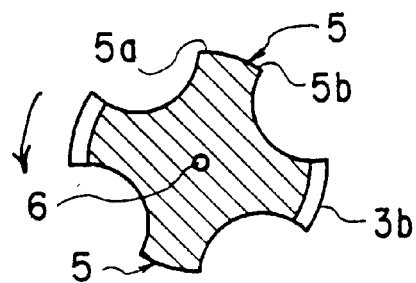
FIG. 2(c) is a sectional view taken on line III—III of FIG. 1.
Figure 2D:
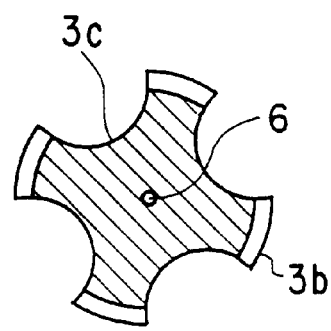
FIG. 2(d) is a sectional view taken on line IV—IV of FIG. 1.
Figure 3A:
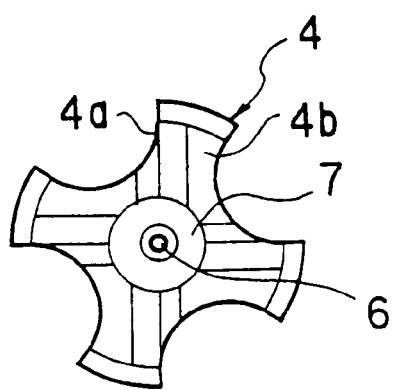
FIG. 3(a) is a view taken on line I—I of FIG. 1 showing a modification of the tap.
Figure 3B:
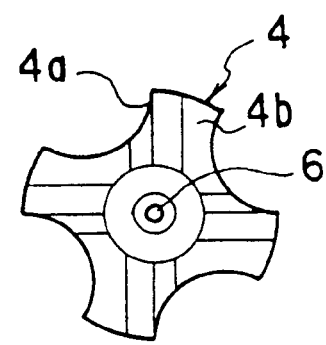
FIG. 3(b) is an end face view taken on line II—II of FIG. 1 showing the modification of the tap.
Figure 4A:
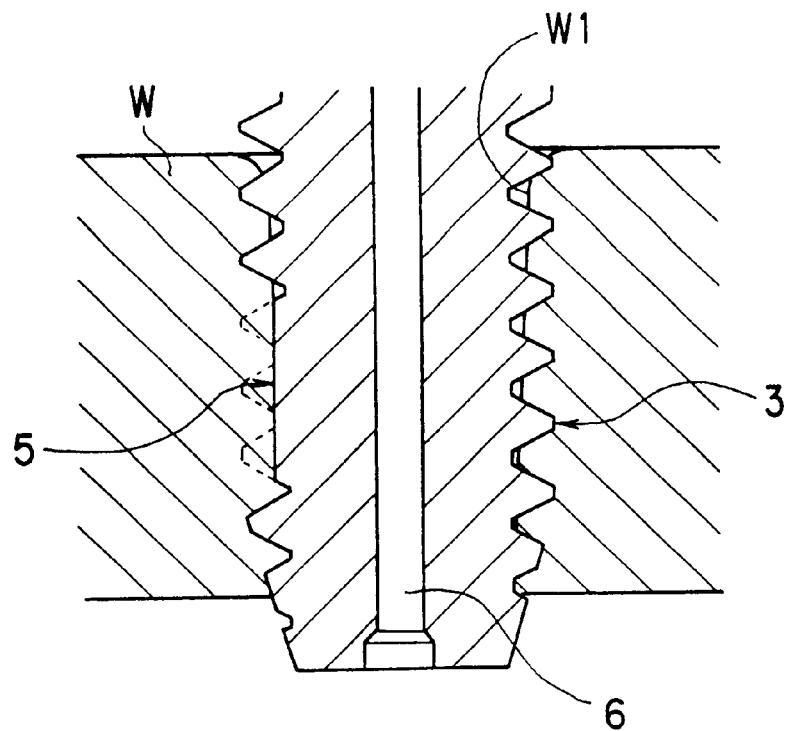
FIGS. 4(a) and 4(b) are explanation drawings for actions of the tap.
Figure 4B:
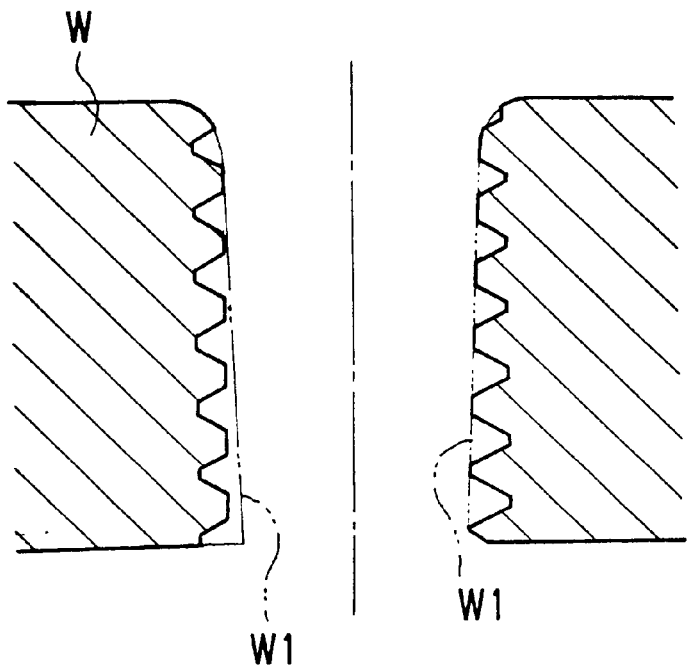

FIG. 1 is an overall constitution drawing of a cutting tap according to a first embodiment of the present invention. FIG. 2(a) is a view taken on line I—I of FIG. 1, FIG. 2(b) is an end face view taken on line II—II of FIG. 1, FIG. 2(c) is a sectional view taken on line III—III of FIG. 1, and FIG. 2(d) is a sectional view taken on line IV—IV of FIG. 1. FIG. 3(a) is a view taken on line I—I of FIG. 1 showing a modification of the tap, and FIG. 3(b) is an end face view taken on line II—II of FIG. 1 showing the modification of the tap. FIGS. 4(a) and 4(b) are explanation drawings for actions of the tap.

As illustrated in FIGS. 1 and 2(a) to 2(d), acutting tap 1 comprises a shank portion 2 having a nearly tetragonal cross sectional shape at a rear end site 2a so as to be chucked by a tapping machine (not shown), and a threaded portion 3 for thread cutting a cored hole W1 of a workpiece W (to be described later on) of a material to be cut.

The threaded portion 3 has a lead 3a whose thread diameter gradually decreases toward a front end of the lead 3a, a complete thread portion 3b continued from the lead 3a, and four straight flutes (may be spiral flutes) 3c arranged at equal intervals in a circumferential direction. In the threaded portion 3, a first cutting edge portion (an end mill blade) 4 for processing a prepared hole is formed which is situated at a front end surface of the lead 3a, and which comprises four cutting edges 4a and four flanks 4b (see FIGS. 2(a) and 2(b)). In the threaded portion 3, a second cutting edge portion (a reamer blade) 5 for finishing a minor diameter is also formed at a pair of opposed lands situated on a front end side of the complete thread portion 3b (at a site where the lead 3a ends). The second cutting edge portion 5 comprises cutting edges 5a and flanks 5b. (See FIG. 2(c)). The cutting edge 4a and the cutting edge 5a are formed on a forward side in a direction of rotation during normal rotation shown by an arrow in FIG. 2(c). The cutting edge 5a is formed over a length of several pitches.

In the drawings, the numeral 6 denotes a center hole/oil hole (i.e., a center hole concurrently serving as an oil hole). As shown in FIGS. 3(a) and 3(b), a spot facing 7 may be formed at a peripheral edge of an opening of the center hole/oil hole 6 so that a cutting resistance will be decreased during bottom face processing of a blind hole.

For tapping, the cutting tap 1 constituted as described above is screwed into the cored hole W1 of the workpiece W. First of all, the cored hole W1 is cut, along its wall, with the four cutting edges 4a of the first cutting edge portion 4 at the front end of the threaded portion 3, as shown in FIG. 4(a). Then, the lead 3a of the threaded portion 3 bites into the cut wall, and the complete thread portion 3b forms an internal thread. At this time, the cutting edges 5a of the second cutting edge portion 5 having a larger outside diameter than the minor diameter of the threaded portion 3 finish the minor diameter of the internal thread to fall within the tolerance.

In FIG. 4(b), the left half shows a processing example in which the minor diameter of the internal thread has been finished by the second cutting edge portion 5 to fall within the tolerance, while the right half shows a processing example in which the cutting tap 1 does not have the second cutting edge portion 5. The four cutting edges 4a of the first cutting edge portion 4 also cut a flash present at the bottom of the cored hole W1.

According to the present embodiment, as described above, processing of a prepared hole, tapping, and finishing of a minor diameter are performed by a single step without tool replacement. Thus, the processing man-hours and the processing time can be markedly decreased, and productivity can be increased.

Furthermore, the first cutting edge portion 4 is directly provided at the front end of the threaded portion 3, without a guide portion provided there, and the second cutting edge portion 5 is provided midway in the threaded portion 3. Thus, the entire length of the tap need not be increased, and tapping can be performed even if a prepared hole for an internal thread is a blind hole or the like and does not have enough space.

Besides, the first cutting edge portion 4 for processing of a prepared hole is provided at the front end of the threaded portion 3. Hence, even if the axis of the cored hole W1 of the workpiece W is eccentric, tapping can be performed, with the eccentricity being corrected with the first cutting edge portion 4.

[Second Embodiment]

Figure 6A:
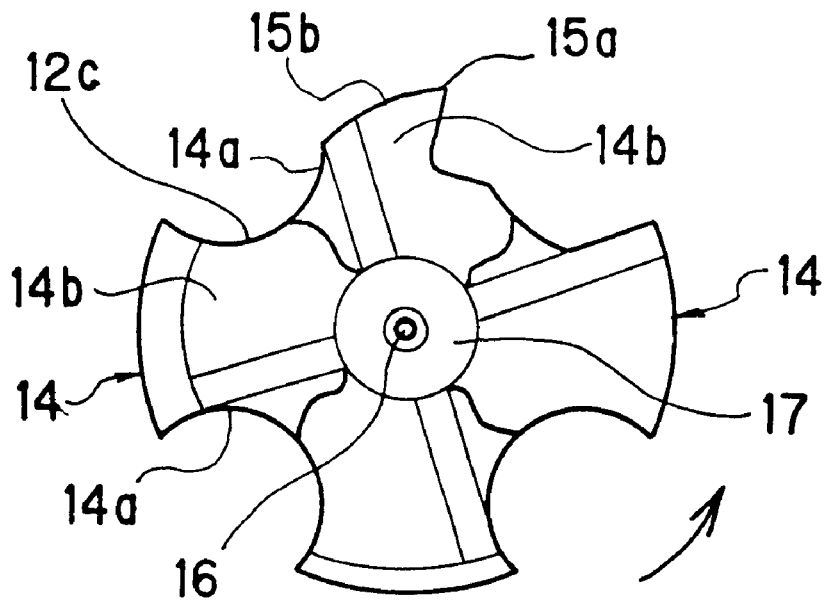
FIG. 6(a) is a view taken on line I—I of FIG. 5.

FIG. 5 is an overall constitution drawing of a thread forming tap according to a second embodiment of the present invention. FIG. 6(a) is a view taken on line I—I of FIG. 5, and FIG. 6(b) is a sectional view taken on line II—II of FIG. 5.

Figure 6B:
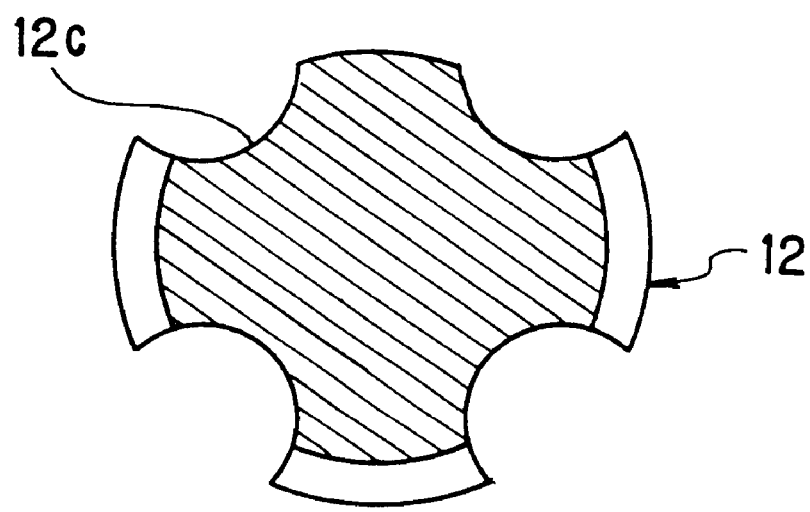
FIG. 6(b) is a sectional view taken on line II—II of FIG. 5.

As illustrated in FIG. 5 and FIGS. 6(a) and 6(b), a thread forming tap 10 comprises a shank portion 11 having a nearly tetragonal cross sectional shape at a rear end site 11a so as to be chucked by a tapping machine (not shown), and a threaded portion 12 for thread cutting a cored hole W1 of a workpiece W (see FIG. 4) of a material to be cut.

The threaded portion 12 has a lead 12a forwardly tapered in a complete thread form, a parallel thread portion 12b continued from the lead 12a, and four oil grooves 12c comprising straight flutes (may be spiral flutes) arranged at equal intervals in a circumferential direction. In the threaded portion 12, a first cutting edge portion (an end mill blade) 14 for processing a prepared hole is formed which is situated at a front end surface of the lead 12a, and which comprises four cutting edges 14a and four flanks 14b. In the threaded portion 12, a second cutting edge portion (a reamer blade) 15 for finishing a minor diameter is also formed at one site between the adjacent oil grooves 12c of the lead 12a. The second cutting edge portion 15 comprises a cutting edge 15a and a flank 15b. The cutting edge 14a is formed on a forward side in a direction of rotation during normal rotation shown by an arrow in FIG. 6(a). Whereas the cutting edge 15a is formed on a forward side in a direction of rotation during reverse rotation made in the direction opposite to the direction shown by the arrow in FIG. 6(a).

In the drawing, the numeral 16 denotes a center hole/oil hole (i.e., a center hole concurrently serving as an oil hole) provided with a spot facing 17.

For tapping, the thread forming tap 10 constituted as described above is screwed (normally rotated) into the cored hole W1 of the workpiece W. First of all, the cored hole W1 is cut, along its wall, with the four cutting edges 14a of the first cutting edge portion 14 at the front end of the threaded portion 12. Then, the lead 12a of the threaded portion 12 bites into the cut wall, and the parallel thread portion 12b forms an internal thread. Then, the thread forming tap 10 is reversely rotated, and returned to the original state. At this time, the cutting edge 15a of the second cutting edge portion 15 having an outside diameter nearly equal to the minor diameter of the internal thread finishes the minor diameter of the internal thread.

A thread forming tap having the second cutting edge portion 15 as described above was previously proposed by the applicant in Japanese Unexamined Patent Publication No. 155640/97. Thus, a detailed description of the thread forming tap will be omitted herein, and reference should be made to this publication for its details.

According to the present embodiment, as described above, processing of a prepared hole, tapping, and finishing of a minor diameter are performed by a single step without tool replacement. Thus, the processing man-hours and the processing time can be markedly decreased, and productivity can be increased.

Furthermore, the first cutting edge portion 14 is directly provided at the front end of the threaded portion 12, without a guide portion provided there, and the second cutting edge portion 15 is provided in the lead 12a of the threaded portion 12. Thus, the entire length of the tap need not be increased, and tapping can be performed even if a prepared hole for an internal thread is a blind hole or the like and does not have enough space.

Besides, the first cutting edge portion 14 for processing of a prepared hole is provided at the front end of the threaded portion 12. Hence, even if the axis of the cored hole W1 of the workpiece W is eccentric, tapping can be performed, with the eccentricity being corrected with the first cutting edge portion 14.

This invention being thus described, it will be obvious that the same may be varied in many ways, including changes in the numbers of the flutes, the first cutting edge portion, and the second cutting edge portion. Such variations are not to be regarded as a departure from the spirit and scope of the invention, and all such modifications as would be obvious to one skilled in the art are intended to be included within the scope of the following claims.

What is claimed is:

1. A tap for performing processing of a prepared hole and tapping by a single step, comprising:

a threaded portion for performing tapping by chipping, said threaded portion including a lead whose thread diameter gradually decreases toward a front end of the lead, a complete thread portion continued from the lead, and a plurality of flutes arranged in a circumferential direction;

a first, non-threaded cutting blade portion formed at a front end surface of the lead and which processes a prepared hole; and a second, non-threaded cutting edge portion formed in a part of an outer periphery of the complete thread portion and which finishes a minor diameter of an internal thread, said second cutting edge portion being one or more pitches long.

2. The tap of claim 1, wherein said first cutting blade portion is formed directly at said front end surface of the lead, without a guide portion, even if a diameter of the prepared hole is smaller than said thread diameter so as to be operative to process a bottom portion of the prepared hole when the prepared hole is a blind hole.

3. The tap of claim 1, wherein cutting edges of the first cutting blade portion and the second cutting edge portion are formed on a forward side in a direction of rotation during normal rotation.

4. The tap of claim 1, wherein a center hole/oil hole is formed in the threaded portion, and a spot facing is formed at a peripheral edge of an opening of the center hole/oil hole at said front end surface of said lead.

* * * * *